US006934766B1

(12) United States Patent
Russell

(10) Patent No.: US 6,934,766 B1
(45) Date of Patent: Aug. 23, 2005

(54) METHOD AND APPARATUS FOR EXCHANGING EVENT INFORMATION BETWEEN COMPUTER SYSTEMS THAT REDUCE PERCEIVED LAG TIMES BY SUBTRACTING ACTUAL LAG TIMES FROM EVENT PLAYBACK TIME

(75) Inventor: Paul J. Russell, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 846 days.

(21) Appl. No.: 09/704,810

(22) Filed: Nov. 2, 2000

(51) Int. Cl.[7] ......................... G06F 15/16; G11B 27/00
(52) U.S. Cl. ...................... 709/246; 709/201; 709/205; 715/753
(58) Field of Search ................................ 709/223, 224, 709/205, 203, 201, 202, 204–7, 230, 247; 370/17; 702/178; 713/200, 401; 714/31; 715/753

(56) References Cited

U.S. PATENT DOCUMENTS 5,206,934 A * 4/1993 Naef, III .................... 709/204
5,467,342 A * 11/1995 Logston et al. ............. 370/253
5,515,491 A * 5/1996 Bates et al. ................. 345/754
5,539,886 A 7/1996 Aldred et al. .......... 395/200.04
5,649,104 A 7/1997 Carleton et al. ....... 395/200.04
5,649,105 A 7/1997 Aldred et al. .......... 395/200.04
6,061,717 A 5/2000 Carleton et al. ............ 709/205
6,084,590 A 7/2000 Robotham et al. .......... 345/419
6,115,053 A 9/2000 Perlin ......................... 345/475
6,138,250 A * 10/2000 Nouri et al. .................. 714/31
6,289,299 B1 9/2001 Daniel et al. ................. 703/21
6,347,374 B1 * 2/2002 Drake et al. ................ 713/200
6,377,281 B1 4/2002 Rosenbluuuth et al. ..... 345/700
6,432,901 B2 8/2002 Cong-Yun et al. .......... 510/376
6,446,113 B1 * 9/2002 Ozzie et al. ................ 709/204
6,463,460 B1 * 10/2002 Simonoff .................... 709/203
6,477,580 B1 11/2002 Bowman-Amuah ......... 709/231
6,584,493 B1 6/2003 Butler ........................ 709/204

(Continued)

*Primary Examiner*—Paul H. Kang
(74) *Attorney, Agent, or Firm*—Barry W. Chapin, Esq.; Chapin & Huang, LLC

(57) ABSTRACT

Mechanisms and techniques provide the system that allows a sending computer system to capture and store event information related to events that transpire on a sending computer system in event batches. The event information can include event functionality related to event object in the timestamp related to the event. Periodically, in response to the occurrence of the batch transfer condition, the sending computer system transmits an event batch monthly computer network for receipt by a receiving computer system. The event batch may be processed through a collaboration adapter on the networks while prior to being send to the receiving computer system. Upon receipt of an event batch at the receiving computer system, the receiving computer system can compute a lag time required to receive the event batch. The receiving computer system can then recreate events based on the event information in the event batches while compensating for network lag time incurred during transmission of the event batch between a sending and receiving computer systems. By compensating for network lag during the recreation or playback of events, the system of the invention avoids the receiving computer system from reproducing events in a choppy or discontinuous manner or from getting left behind during event recreation due to accumulations of network lag time.

26 Claims, 6 Drawing Sheets

U.S. PATENT DOCUMENTS 6,598,078 B1 * 7/2003 Ehrlich et al. .............. 709/224
6,611,495 B1 * 8/2003 Meyer et al. ............ 370/230.1
6,693,921 B1 * 2/2004 Whitfield .................... 370/516
6,751,573 B1 * 6/2004 Burch ........................ 702/178
6,802,019 B1 * 10/2004 Lauder ....................... 709/204

* cited by examiner

150
BATCH M-1

| 248-1 EVENT BATCH START TIME (E.G., :000) | 249-1 EVENT BATCH END TIME (E.G., :100) | 250-1 EVENT BATCH RECEIVE TIME (E.G., :135) | 251 EVENT1 DATA | 252 EVENT2 DATA | 253 EVENT3 DATA | 254 EVENT4 DATA |
|---|---|---|---|---|---|---|
| | | | 255 TSE1 :000 | 256 TSE2 :020 | 257 TSE3 :045 | 258 TSE4 :070 |

| 248-2 EVENT BATCH START TIME (E.G., :100) | 249-2 EVENT BATCH END TIME (E.G., :200) | 250-2 EVENT BATCH RECEIVE TIME (E.G., :270) | 261 EVENT5 DATA | 262 EVENT6 DATA | 263 EVENT7 DATA | 264 EVENT8 DATA | 265 EVENT9 DATA |
|---|---|---|---|---|---|---|---|
| | | | 266 TSE5 :101 | 267 TSE6 :125 | 268 TSE7 :154 | 269 TSE8 :158 | 270 TSE9 :200 |

151
BATCH M

METHOD AND APPARATUS FOR EXCHANGING EVENT INFORMATION BETWEEN COMPUTER SYSTEMS THAT REDUCE PERCEIVED LAG TIMES BY SUBTRACTING ACTUAL LAG TIMES FROM EVENT PLAYBACK TIME

FIELD OF THE INVENTION

The present invention generally relates to mechanisms and techniques for exchanging event information between computer systems, and more particularly, to systems and techniques which allow event information to be captured and transmitted from a sending computer system to a receiving computer system so that the receiving computer system can reproduce events based on the event information.

BACKGROUND OF THE INVENTION

The rise in popularity of computer networks such as the Internet has led software application developers to develop complex software applications which interact between different computer systems over the network. One example of such a software application is collaboration software which allows respective users of two or more computer systems to exchange information during a collaboration session. In an example collaboration session, if a user on one computer system enters information or manipulates an image on that user's computer display, the collaboration software can convey such information or image manipulations to recipient computer systems of other participants (i.e., other users) involved in the collaboration session. The recipient computer systems receive the information or image manipulations and attempt to duplicate or recreate the information or image manipulations on the computer display(s) of the recipient computer systems for viewing by participants controlling such computer systems. In this manner, actions taken by one participant involved in the collaboration session can be witnessed by other participants in the collaboration session.

Another example of collaboration software is a chat program allowing two or more users who are collaborating in a "chat room" to each type in information via keyboards on their respective computer systems. The chat room collaboration software distributes information (e.g., characters) typed into the chat room by each respective user to the other computer systems of the other users in the chat room so that collaboration software on those other computer systems can display such information to those other users. Thus if one user types "Hello everyone," the collaboration software on that users computer system will convey the text "Hello everyone" using one or more collaboration messages to collaboration software that performs (e.g., executes) on the computer systems of every other user involved in the chat room collaboration session. Collaboration software that receives such collaboration messages will extract and display the text within those messages such that the text "Hello everyone" will appear on each chat room participant's display. If the user who originally typed "Hello everyone" is a slow typist, the collaboration software might transfer the text "Hello everyone" character by character in separate collaboration messages to each chat room participant's computer system for display on such systems. This provides the effect of having other participants witness the typing of "Hello everyone" by the sending participant in a realistic manner on each recipient participant computer system.

Another type of conventional collaboration software involves the exchange of graphical information between computer systems involved in a collaboration session. An example of such collaboration software is called "whiteboard" software. Whiteboard software allows a collaboration participant on one computer system to use a pointing device such as a mouse, for example, to add, remove, alter or move (i.e., drag and drop) graphical images on that participant's computer display. Much like the chat room collaboration software mentioned above, the whiteboard software performing on the computer system on which such graphical manipulations originally take place transmits information relating to such graphical manipulations in one or more collaboration messages to recipient computer systems involved in the collaboration session. Collaboration software performing on the recipient computer systems receives the collaboration messages and attempts to recreate the same graphical manipulations on the recipient participant's computer display for viewing by that participant, based on information in the collaboration messages.

Whiteboard software allows, for example, a participant to create a graphical manipulation by drawing an image on his or her computer display using the collaboration software. During the process of drawing the image, the collaboration software on that participant's computer system attempts to periodically convey information relating to representation of the current state of the image (e.g., image position, size, direction of movement, etc.) via the collaboration messages that the collaboration software sends to the other participant computer systems (there may be one or more of other participant systems). The collaboration software on the other participant computer systems retrieves the representation of the current state of the image in the collaboration messages and attempts to recreate the operation, manipulation or creation of the image as it is being drawn by the first participant. This allows the recipient participants to view the creation of the image.

SUMMARY OF THE INVENTION

Conventional collaboration techniques such as those discussed above suffer from a variety of drawbacks. Most notably, conventional techniques that capture, track or monitor information or events which occur on a first computer system (e.g., graphical movements of an object) and then attempt to transmit the information or events as they occur to a second computer system for realistic recreation, playback or reproduction on the second computer system can suffer from processing and transmission delays. For example, as information relating to the occurrence of events (e.g., graphical movement of an object on a first computer system during a collaboration session) is propagated or otherwise transmitted to the second computer system through a computer network, the processing and transmission time required to send the information between computer systems is not negligible. Rather, such processing delays or transmission times, referred to herein as "lag time" or "network lag time", can significantly and adversely affect the realistic recreation and timing of the same graphical events on the second computer system (i.e., the receiving computer system).

Since conventional event recreation techniques used, for example, in collaboration systems, do little to compensate for the time required to transmit the event information between a sending and receiving computer system (i.e., do not compensate for network transmission or lag time), the conventional receiving computer system that attempts to recreate the event information in a realistic manner can potentially get left behind as the collaboration session proceeds or such systems may display choppy, bursty or discontinuous playback.

By way of example, suppose a participant to a collaboration session begins performing a series of graphical events which produce movement of an object across that participant's computer display. Conventional collaboration software on that participants computer system (the sending computer system) can capture event information related to the movement of the graphical object and can relay this event information over a computer network to a collaboration server. The collaboration server can then forward this event information to each participant computer system (receiving computer systems) involved in the collaboration session. The process of forwarding this event information may take an appreciable amount of time, such as a few seconds or more. When each participant computer system receives the event information from a collaboration server, collaboration software on each participant computer system attempts to duplicate the same graphical movement of an object on a computer display coupled to that participant's computer system based upon the event information which it receives. Over time, problems arise because conventional techniques for re-creating events based on the event information do not compensate for the network lag time required for transmitting and receiving the event information.

As such, as the receiving participant's computer system completes reproduction of a graphical movement as instructed in a first set of event information, the sending computer system that originated the first set of event information may be busy producing a second set of event information. However, due to delays in the computer network (e.g., network congestion causing network lag), the receiving computer system may not receive the second set of event information in a timely manner. When the receiving computer system does receive the second set of event information, it will have been delayed by an amount of time required to process and transmit the second set of information from the sending computer system, through the network, and possibly through a collaboration server, and on to the receiving computer system. Since the receiving computer system using conventional techniques does not reproduce the event information while compensating for this network lag time, the graphical movements that the collaboration software reproduces on the receiving computer system can become further and further delayed or out of synchronization with the sending computer system upon which graphical movement initially takes place.

It is possible then, in conventional event reproduction techniques which might be used, for example, in collaboration systems, for a receiving computer system to get left behind or display choppy discontinuous or bursty playback of events during a collaboration session due to the effects of lag time.

The system of the present invention provides mechanisms and techniques which significantly overcome these problems. In particular, the system of the invention provides mechanisms and techniques which provide for the capture of event information in a sending computer system and further provide for the reproduction of this event information on a receiving computer system while attempting to compensate for any lag time required in processing and transmitting the event information between sending and receiving computer systems. On the receiving computer system that attempts to re-create events based on the event information, lag time such as network propagation time of the event information is taken into account during event re-creation in order to minimize the amount of time by which the receiving computer system gets left behind, for example, during a collaboration session. By compensating for network time during event recreation, the system of the invention also provides for a more realistic reproduction of events on a receiving computer system.

In particular, the system of the invention provides method embodiments for processing event information. One such method embodiment provides a method for processing event information for use by a receiver of the event information. The method comprises the steps of detecting an event (one or more) and generating a timestamp for the event(s) and then storing the event(s) and the timestamp of the event(s) in an event batch. The method then transmits the event batch to a receiver, such that the receiver of the event batch can process the event(s) in the event batch. By including timestamp information associated with each event in an event batch, the system of the invention provides a novel technique for batching event information which can be used to re-create events based on the event information in a receiving computer system while compensating for lag time required to process and transmit that event information to the receiving computer system.

According to another embodiment of the invention, the step of detecting includes the steps of receiving a plurality of event notifications and filtering the plurality of event notifications according to an event filter function. The method also detects when the event filter function indicates that an event is to be stored in the event batch, thus providing the detection of the at least one event. In this manner, this method embodiment provides for selective inclusion of an event in an event batch. This embodiment is useful in situations, for example, where there are many events occurring in a relatively short amount of time. In such cases, it may not be necessary to transmit or convey event information for each individual event that occurs to a receiving computer system for reproduction of all events on the receiving computer system. Instead, the filtering techniques of this invention as recited in this embodiment allow the sending computer system to select only certain events which are then packaged as event information in an event batch for transmission to the receiving computer system.

In another embodiment, the event filter function causes the step of filtering to detect a predetermined number of event notifications before indicating that an event is to be stored in the event batch. As an example, the system of the invention can select every $K^{th}$ event to be included as event information in event batch. This way, the system of the invention maintains a manageable size (i.e., number of events) for the event batch instead of attempting to capture event information for all events that occur. The selection of the predetermined number for the event filter may, for instance, relate to how many events must be selected for inclusion into an event batch in order to reproduce a perceptible change in behavior on the receiving computer system, when that receiving computer system reproduces events based on the event information in the event batch. That is, if one hundred graphical events occur, for example, in one second of time on the sending computer system, it may be the case that the system of the invention may only need to include, for example, ten (10) of such graphical events in an event batch. If the system of the invention were to include more events than ten, such additional events may not produce sufficiently perceptible changes (i.e., to a human observer) in the graphical behavior on the receiving computer system when that receiving computer system reproduces events to mimic the graphical behavior that took place on the sending computer system.

In another embodiment, the step of detecting an event includes the step of creating an event object in response to detecting an action occurring on a sender object. The event object specifies i) event functionality corresponding to the action occurring on the sender object and ii) an identity of an receiver object upon which to perform the event functionality. In this manner, an event batch can contain event objects that identify an object on the receiving computer system (a receiver object) and a action of function which the receiving computer system is to perform on the receiver object during reproduction or playback of the event information.

In yet another embodiment, a method is provided in which the step of transmitting transmits the batch of events to the receiver in response to detecting the occurrence of a batch transfer condition. The batch transfer condition can be, for example, i) determining that a time difference between occurrences of events exceeds a predetermined value, ii) determining that a predetermined number of events has been stored in the event batch or iii) detecting that the at least one event is a terminating event. Such batch transfer conditions cause the sending computer system to send the set of events identified in the event batch to the receiving computer system. Batch transfer conditions may be established (i.e., chosen) such that a consistent flow of event batches takes place between the sending and receiving computer systems.

In another embodiment, at least one event represents a graphical action performed on an object on a display of a computer system and the event batch contains a plurality of events that represent a sequence of graphical actions performed on sender objects on the display of the computer system. The step of transmitting the event batch transmits the event batch to a collaboration adapter for distribution to at least one receiving computer system involved in a collaboration session. This is done so that the receiving computer system can recreate events on receiver objects based upon the event batch containing the plurality of events. The events thus represent the sequence of graphical actions performed on sender objects which correspond to the receiver objects. Accordingly, the system of the invention can be used to exchange event information between participant computer systems in a collaboration session while taking into account network lag that effects how quickly event information can be transferred from one participant computer system to another.

In another embodiment, the steps of detecting, generating, storing and transmitting are performed by a processor in a computer system performing a real-time event capture process that operates in conjunction with a browser process to capture graphical events as they occur from user interaction with the browser process. Such a real-time event capture process may be a real-time Java class that operates in conjunction with a browser process on the sending and/or receiving computer systems.

Other embodiments of the invention include methods for processing event information on a receiving computer system. One such method embodiment includes the steps of receiving an event batch identifying at least one event and calculating a lag time associated with the event batch. The method then re-creates events identified in the event batch while compensating for at least a portion of the lag time required to receive the event batch. In this manner, the receiving computer system that re-creates events from event information in event batches will not get behind in re-creating events produced by the sending computer system. In other words, since the invention accounts for network lag incurred to receive each event batch, and re-creates or plays back events in an event batch while compensating for network lag, network lag experienced for successive event batches will not accumulate in the receiving computer system resulting in significant delays in event recreation. This embodiment also produces a more realistic playback of events.

In another embodiment, the step of recreating includes the steps of dividing the number of events contained in the event batch by the lag time to determine a lag time per event, and then recreating at least one event identified in the event batch at an event playback time computed by subtracting at least a portion of the lag time per event from an event playback time computed based on a timestamp of the at least one event contained in the event batch. By removing some or all of the lag time per event from at least one interval of time between two events, the invention helps to compensate for network lag time experienced during the transmission of an event batch.

In yet another embodiment, the step of recreating at least one event identified in the event batch limits the subtraction of the at least a portion of the lag time per event from an event playback time such that an amount of time between consecutive event playback times is a perceptible amount of time at which events are recreated. In this manner, even though the system of the invention can remove network lag time from intervals between the recreation of events, in this embodiment, the invention will not remove so much lag time between two events such that the events would be imperceptible from each other, for example, by a person viewing event playback. This avoids events which have short intervals between themselves from being reduced to appear as a single event.

In another embodiment, the event batch is an event batch M and the step of receiving an event batch includes a step of generating a receive time for the event batch M. Also in this embodiment, the step of calculating a lag time required to receive the event batch includes the steps of computing an ideal send time for the event batch M and computing the lag time as a difference between the receive time for the event batch M and the ideal send time for the event batch M. In other words, the ideal send time is the time the event batch would have been received if there were no lag time. By taking the difference between this time and the actual receive time, the lag time can be determined.

In still a further embodiment, the step of computing an ideal send time for the event batch M includes a step of adding a receive time for an event batch M-1 to an amount of elapsed time between a start and an end time of the event batch M.

In yet another embodiment, the step of recreating events identified in the event batch includes the steps of dividing the lag time by a multiple that is related to a number of events identified in the event batch to determine a lag time per event. Then, for each of the event(s) identified in the event batch, performing event functionality defined for that event on a respective receiver object corresponding to an identity of a receiver object defined for that event in the event batch, at an event playback time that is computed based on: i) a timestamp associated with the at least one event in the event batch and ii) the lag time per event. Thus, by reproducing events while account for a lag time per event (based on the lag time for the entire event batch), the sequence of events in an event batch can be played back in a "shortened" manner to removes network lag time from the playback sequence so that the last event is reproduced at an approximate time at which it would have been reproduced had there been no lag time.

In another method embodiment, the event batch is an event batch other than a first event batch. In this embodiment, the method further includes the steps of receiving the first event batch and recreating events identified in the first event batch at respective event playback times computed based on a respective timestamps associated with each event identified in the first event batch. Thus the invention treats the first event batch in this embodiment differently than the other event batches by playing back events in the first event batch without attempting to compensate for network lag experienced in receiving the first event batch. The method further performs the steps of receiving, calculating and recreating for all event batches other than the first event batch such that events identified in event batches received after the first event batch will be recreated by taking into account lag time required to receive the event batch in which those events are identified.

Other embodiments of the invention include computer systems configured to perform all of the method embodiments summarized above and explained herein as the invention. In particular, such computer system embodiments include an input output mechanism, a processor, a memory system and an interconnection mechanism coupling the input output mechanism, the processor and the memory system. The memory system is encoded with an event transponder process that, when performed on the processor, provides an event transponder that causes the computer system to process event information by performing the operations of the method embodiments of the invention. That is, the invention includes computer systems configured to perform all of the method operations in embodiments disclosed above and elsewhere herein.

Generally, embodiments of the invention can perform all of the methods and techniques disclosed herein via software control, or via hardware and/or software configured to perform those methods and the techniques, or via hardware (i.e., circuitry) alone configured to carry out these operations.

Other embodiments of the invention that are disclosed herein include software programs to perform the operations summarized above and disclosed in detail below. More particularly, a computer program product is disclosed which has a computer-readable medium including computer program logic encoded thereon to provide the methods for processing event information according to this invention. The computer program logic, when executed on at least one processor within a computing system, causes the processor to perform the operations (e.g., the method embodiments above, and described in detail later) indicated herein. This arrangement of the invention may be provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software, firmware or other such configurations can be installed into a computer system to cause the computer system to perform the techniques explained herein as the invention.

It is to be understood that the system of the invention can be embodied strictly as a software program, as software and hardware, or as hardware alone. Is also to be understood that the event processing techniques and mechanisms of this invention typically perform (e.g., execute, run, or are otherwise operated) on computer systems coupled to a computer network.

The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

The present invention provides techniques and mechanisms that allow sending and receiving computer systems to exchange event information such that the receiving computer system can re-create events based on the event information while compensating for lag time required to receive the event information from the sending computer system. In particular, on a sending computer system, the system of the invention can detect the occurrence of events and can store event information related to the events in an event batch. The sending computer system can then transmit an event batch containing the event information to a receiving computer system. An event transponder configured according to the invention on the receiving computer system can receive the event batch and can use timestamp and/or other information associated with the event batch to calculate a lag time required to receive the event batch. The event transponder of the invention can then use event information within the event batch to reproduce events while compensating for a portion of the lag time required to receive the event batch.

By way of example, if an event batch contains event information for a number of events which span a two (2) second interval of time, and the techniques of the invention determine that a lag time of ¼ second was required to transfer the event batch from the sending computer system to the receiving computer system, the system of the invention can re-create events on the receiving computer system based on event information within the event batch while compensating for the ¼ second of lag time required to receive the event batch. As will be explained, the system of the invention might, for example, remove an equal amount of the ¼ second of lag time between playback or event recreation times for each event identified in the event batch. Specifically, if there are perhaps four events identified in the event batch, thus defining three event recreation or playback time intervals (i.e., the time between events E1 and E2, E2 and E3, and E3 and E4), the system of the invention might remove 1/12 of a second from each time interval between the playback of events E1 through E4, thus compensating (i.e., making up for) the network lag time.

In this manner, as the system of the invention re-creates events identified in the event batch, during the course of recreation of these events, the recreation cycle or time it takes to re-create all events within the event batch is shortened overall by an amount of time equal to the lag time that the event batch experienced during transmission from the sending computer system to the receiving computer system. Using the techniques explained herein, the receiving computer system can participate in a collaboration session and can re-create events in event batches without getting behind (i.e. without becoming unsynchronized) in the playback of the sequence of events that the sending computer system originates.

Figure 1:
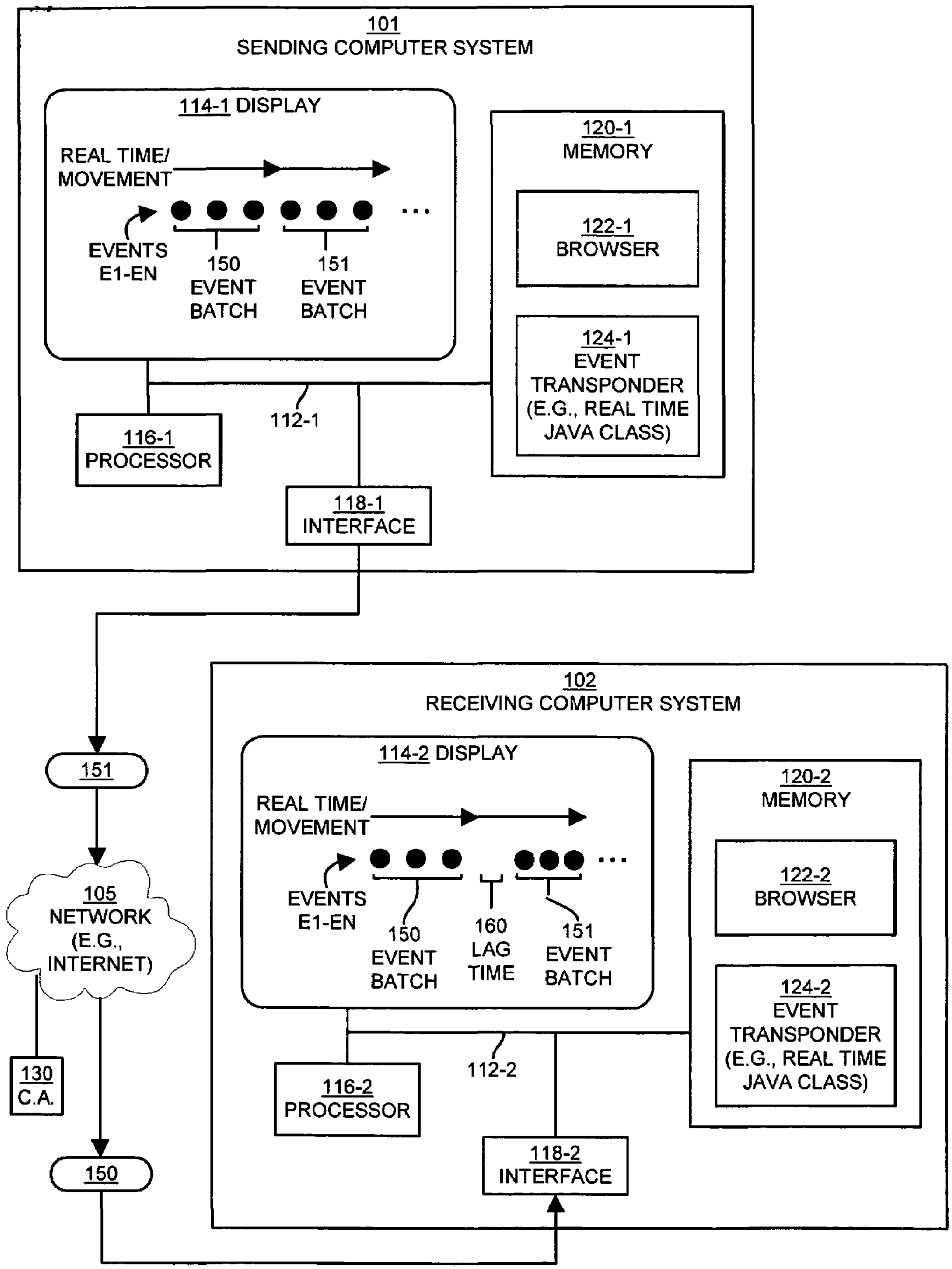
FIG. 1 illustrates a computing system environment that is suitable for use in describing example operations of embodiments of the invention.

FIG. 1 illustrates an example of a computing system environment 100 configured in accordance with an embodiment of the invention. The computing system environment 100 includes a network 105, such as the Internet, which couples a sending computer system 101 and a receiving computer system 102, and in this example, also couples to a collaboration adapter 130. Both the sending computer system 101 and the receiving computer system 102 in this example include an interconnection mechanism 112 (112-1 and 112-2 respectively) which couples a display 114 (114-1 and 114-2 respectively), a processor 116 (116-1 and 116-2 respectively), an input output interface mechanism 118 (118-1 and 118-2 respectively) and a memory system 120 (120-1 and 120-2 respectively). The memory systems 120-1 and 120-2 within each computer system 101 and 102 are encoded with software processes which include a browser process 122 (122-1 and 122-2 respectively) and an event transponder 124 (124-1 and 124-2 respectively) configured according to embodiments of the invention. Also shown in FIG. 1 are event batches 150 and 151 which are transmitted, as will be explained, from the sending computer system 101 through the computer network 105 to the receiving computer system 102. In the following description, the elements of the sending computer system 101 are referred to with the modifier "sending" (e.g., sending processor 116-1), and the elements of the receiving computer system 102 are referred to with the modifier "receiving" (e.g. receiving processor 116-2).

Generally, in this example embodiment, the processors 116 can perform (e.g., can execute, interpret, run or otherwise perform) the browser and event transponder processes 122 and 124 to carry out the techniques of the invention. Though not required for this invention, the browser 122 is shown in this example as providing a mechanism for displaying and providing a mechanism to manipulate objects such as graphics on the displays 114. In the illustrated embodiment, the event transponder processes 124 contain logic instructions that, when performed on the processor 116, operate to perform the event processing of this invention. The event transponders 124 may be Java classes, for example, that operate (i.e., perform on the processors 116) in real-time in conjunction with the browser 122 on both the sending and receiving computer systems 101 and 102.

Directing attention now specifically to the displays 114 in each computer system 101 and 102, the displays 114 provide a graphical representation of events E1 through EN, each of which is illustrated in these example embodiments as a black circle. For purposes herein, the events E1 through EN may also be considered to represent event objects. Event objects on the sending computer system 101 are collectively referred to as sender objects while event objects on the receiving computer system 102 are collectively referred to as receiver objects. Also shown in the example displays 114 is a horizontal progression of events from left to right across the display 114. This horizontal progression of events E1 through EN takes place over time and represents movement of a graphical object from left to right on the computer display 114.

As a specific example, perhaps a user (not specifically shown) of the sending computer system 101 has selected the leftmost graphical event object E1 (i.e., the leftmost black circle) via a graphical input device such as a hand operated mouse and has selected and dragged (i.e., dragged and dropped) or otherwise moved the sender event object E1 across the sending display 114-1 causing the occurrence of events E1 through EN (i.e., causing the creation of event objects E1 through EN).

Also as shown within the displays 114 are event batches 150 and 151. Generally, as will be explained further, on the sending computer system 101, the sending event transponder 124-1 (while performing on the sending processor 116-1) detects a certain number of events and packages, groups or batches them together in an event batch 150, 151. The details of the contents of an event batch 150, 151 will be explained in later. For now, it is sufficient to understand that an event batch includes event information that describes information about the occurrence of events in the sending computer system 101. The sending event transponder 124-1 at some point in time (as will be explained) can transfer the event batches 150, 151 to the receiving computer system 102 for receipt by the receiving event transponder 124-2. The receiving event transponder 124-2 can use the event information within the event batches 150 and 151 to reproduce the events E1 through EN on the receiving display 114-2 of the receiving computer system 102 while compensating for network lag time (e.g., transmission delays) that the event batches 150 and 151 might experience while propagating through the computer network 105.

Figure 2A:
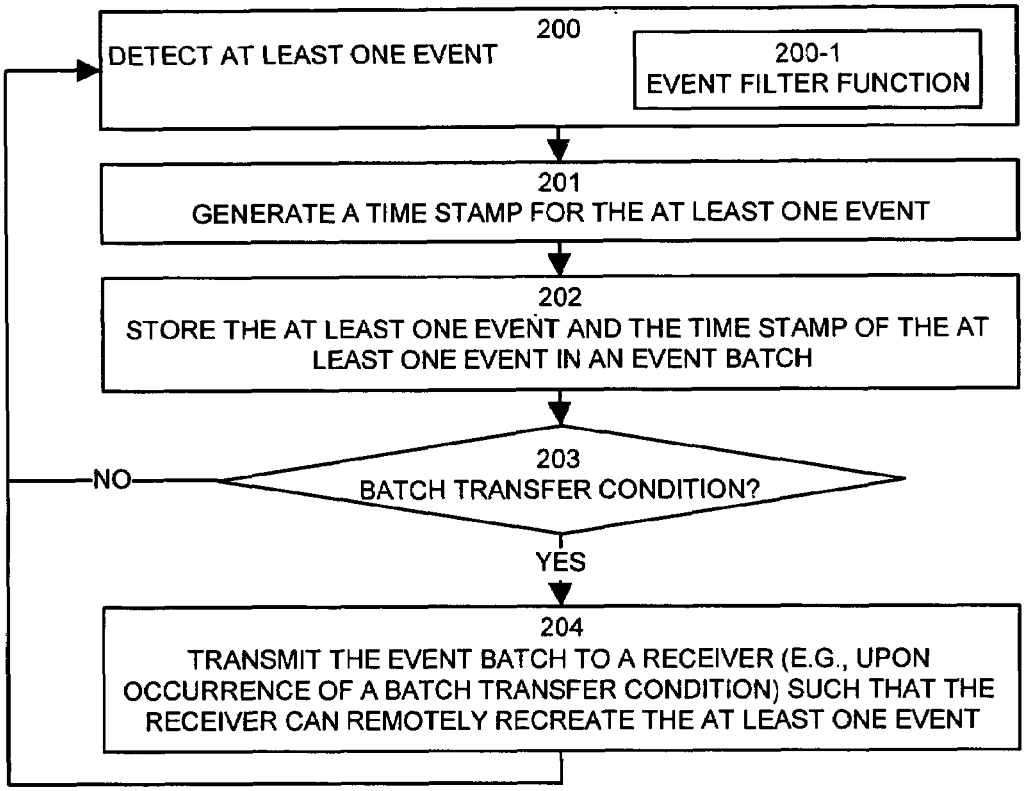
FIG. 2A is a flow chart of processing steps performed by an event transponder operating in a sending computer system to batch events according to one embodiment of the invention.
Figure 2B:
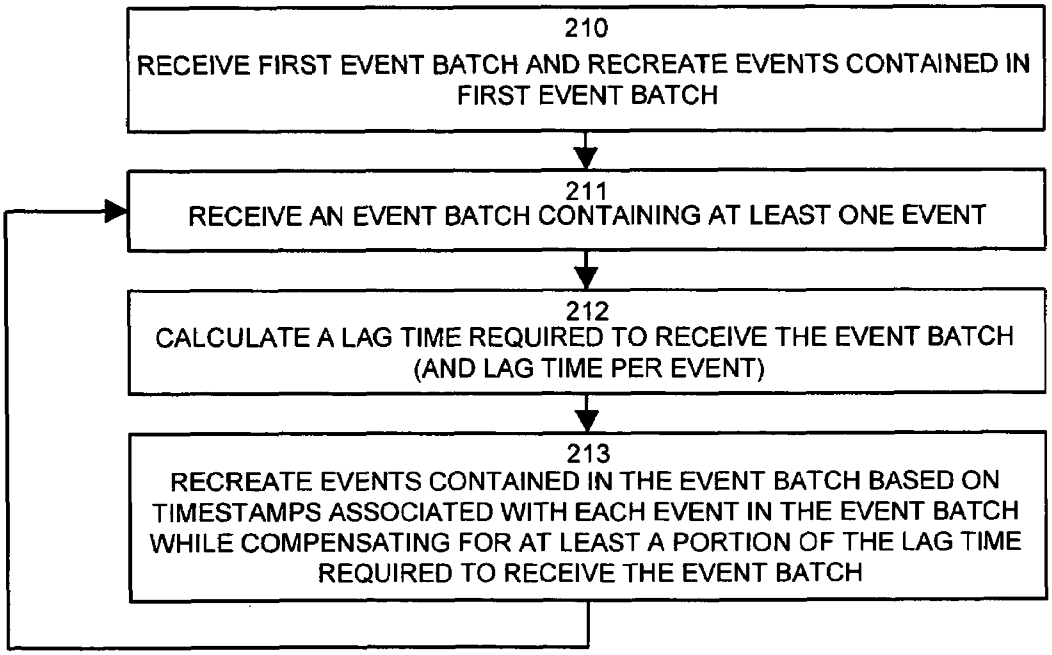
FIG. 2B is a flow chart of processing steps performed by an event transponder operating in a receiving computer system to receive to re-create events contained in event batches according to one embodiment of the invention.

FIGS. 2A and 2B show the high-level processing steps that processors 116-1 and 116-2 carry out when performing operation of the event transponders 124-1 (FIG. 2A) and 124-2 (FIG. 2B) according to embodiments of the invention. Though the illustrated example in FIG. 1 only shows one-way communication between the sending event transponder 124-1 in the sending computer system 101 sending event batches 150 and 151 to the receiving event transponder 124-2 in the receiving computer system 102, it is to be understood that both event transponders 124 can embody the functionality of the processing described in both FIGS. 2A and 2B such that event batches can be sent in both directions concurrently so that each computer system can recreate events, according to the techniques explained herein, that initially occur on the other computer system.

Referring first to the processing in FIG. 2A and the operation of the sending computer system 101, in step 200, the sending processor 116-1 performs the sending event transponder 124-1 to detect at least one event E1 through EN that occurs in the sending computer system 101. As noted above, the events E1 through EN in this example are graphical events which occur on the sending display 114-1. As such, during the movement of a graphical event object (i.e., the black circle) across the sending display 114-1, each different placement of the graphical object on the display may cause the processor 116 to generate or create a notification of a possible event. During its execution, the sending event transponder 124-1 may thus receive a plurality of event notifications (i.e., indications on event for each different placement of the graphical event object).

As shown in step 200, the process of detecting at least one event may include the use of an event filter function 200-1 which the sending event transponder 124-1 can use to filter the plurality of event notifications. By way of example, the event filter function 200-1 may specify that the sending event transponder 124-1 is to detect an event every 1/10 of a second. Thus the sending event transponder 124-1 uses the event filter function 200-1 in step 200 to detect a graphical event every 1/10 of the second by selecting the event notifications that occur at these 1/10 second time intervals.

Next, in step 201, the sending processor 116-1 performs the sending event transponder 124-1 to generate a timestamp for the event detected in step 200. The timestamp may be, for example, the current time on the sending computer system 101 at which the sending event transponder 124-1 detected the event in step 200.

Next, in step 202, the sending processor 116-1 stores the event and the timestamp for the event in an event batch 150. The event batch 150 may be a data structure or object that the sending event transponder 124-1 (via performance on the sending processor 116-1) maintains in the sending memory system 120-1.

In step 203, the sending processor 116-1 further performs the sending event transponder 124-1 to determine if a batch transfer condition has occurred. Generally, a batch transfer condition indicates to the sending event transponder 124-1 executing on the sending processor 116-1 that a condition has occurred which warrants the transmission of the event batch to the receiving computer system 102. Examples of batch transfer conditions that the sending processor 116-1 can detect according to this embodiment of the invention are i) the sending processor 116-1 determining that a time difference between occurrences of events exceeds a predetermined value, or ii) the sending processor 116-1 determining that a predetermined number of events (e.g., 5 events) has been stored in the event batch (e.g., 150 in this example) or iii) the sending processor 116-1 detecting that the at least one event is a terminating event. In step 203, if the sending processor 116-1 does not detect a batch transfer condition, then processing returns to step 200 to detect the occurrence of the next event E1 through EN. However, in step 203, if the sending processor 116-1 does detect the occurrence of a batch transfer condition, then processing proceeds to step 204.

In step 204, the sending processor 116-1 performs the sending event transponder 124-1 to transmit the current event batch (e.g., the first event batch 150 in this example) to the receiving computer system 102 such that the receiving computer system 102 (i.e., the receiving event transponder 124-2 performing on the receiving processor 116-2) can remotely receive the event batch 150 and can re-create any events in the event batch 150 (i.e., can re-create the graphical events identified within the event batch 150).

In this manner, the processing of detecting a batch transfer condition in step 203 limits the number of events that can be contained in any one particular event batch 150, 151, and so on. For example, if the sending processor 116-1 determines that a time difference between occurrences of events exceeds one-third of a second (an example of a batch transfer condition), the sending processor 116-1 performing the sending event transponder 124-1 may proceed to the processing in step 204. Perhaps pauses in the graphical movement of an object on the sending display 114-1 might halt the production of graphical event notifications. As such, if enough time passes prior to the existence of the next event notification, the processing of the invention triggers a batch transfer condition to occur which causes the current set of events identified in the event batch 150 to be transmitted to the receiving computer system 102. Likewise, if the sending processor 116-1 detects and stores a predetermined number of events in an event batch via multiple iterations of processing steps 200 through 203, once a predetermined number of events exist in the event batch 150 (e.g., five events), the event batch transfer condition in step 203 is triggered to cause the sending processor 116-1 to transfer the event batch to the receiving computer system 102. Also as indicated above, a terminating event may cause the sending processor 116-1 to perform step 204 to transmit the event batch to the receiving computer system 102. A terminating event might be, for example, the user completing the drag-and-drop process of moving the graphical object (i.e., the black circle) from left to right on the sending display 114-1. Specifically, the terminating event might in this case be the released of a mouse button indicating that the graphical movement of the object is complete.

After the sending processor 116-1 completes processing of step 204, processing returns to repeat steps 200 through 204 in order to create a new event batch 151 for subsequent events that occur in the sending computer system 101. Using this processing then, the system of the invention is able to continually detect events and place these events in an event batch along with a timestamp associated with each event. Upon the occurrence of a batch transfer condition, the sending event transponder 124-1 triggers the transmission of the event batch (150 in this example) to the receiving computer system 102.

Depending upon the particular configuration of the computing system environment 100, the event transponders 124 may communicate or transmit the event batches 150, 151 and so on to a collaboration adapter 130 on the computer network 105. The collaboration adapter 130 can then be responsible for forwarding each event batch 150, 151 to any receiving computer systems 102 (only one shown in FIG. 1) involved in a collaboration session for recreation of the events on those participant receiving computer systems (102 in this example). Using the collaboration adapter 130, the system of the invention can allow events that occur in a single sending computer system 101 to be re-created on multiple receiving computer systems (not shown) configured like the receiving computer system 102.

FIG. 2B shows the processing steps performed by an receiving event transponder 124-2 configured according to embodiments of the invention to receive event batches 150, 151 and so on and to re-create events identified in those event batches on the receiving display 114-2 of the receiving computer system 102 in which the event transponder 124-2 operates. For the following description, it is to be understood that the receiving processor 116-2 performs (e.g., executes, interprets, runs, or otherwise operates) logic instructions contained in the receiving event transponder 124-2 process encoded within the receiving memory system 120-2.

In step 210, the receiving processor 116-2 performs the receiving event transponder 124-2 to receive the first event batch 150 and to re-create events contained in the first event batch 150. For the first event batch 150, events may be re-created based upon the timestamps provided for each event identified in the event batch 150 (which the sending event transponder 124-1 stored in the event batch 150 during execution of steps 200 through 203 on the sending processor 116-1 in the sending computer system 101, as explained above). For instance, the event batch 150 may indicate that four events E1 through E4 occurred at time equal to the values of timestamps TS1 through TS4 (not specifically shown in this figure). Accordingly, when the receiving processor 116-2 performs step 210 for the first event batch 150, events E1 through E4, the receiving processor 116-2 recreates those events on the receiving computer system's receiving display 114-2 at those times in relation to the time at which the receiving event transponder 124-2 receives that first event batch 150 in step 213. In this embodiment, network lag time for the first event batch is ignored.

Next, in step 211, the receiving processor 116-2 performs the receiving event transponder 124-2 to receive the next event batch 151 that contains at least one event.

Next, in step 212, the receiving processor 116-2 performs the receiving event transponder 124-2 to calculate or compute any lag time (e.g., network lag time) required to receive the event batch 151 (i.e., the most recent event batch received in step 211). Lag time may occur as a result of congestion within the computer network 105 during the transmission of event batch is 150, 151 from the sending computer system 101 to the receiving computer system 102. Essentially, this lag time is a delay that the event batches 150 and 151 experience which the system of the invention compensates (e.g., removes) for during the reproduction of events identified in these event batches. In other words, if lag time exists, the system of the invention can compute this lag time and then, as will be explained in more detail shortly, can remove this lag time from the total playback or recreation time required to reproduce events identified in an event batch. In particular, as noted in step 212, the receiving processor 116-2 computes a lag time per event.

Generally, the lag time per event is essentially a total lag time that is required to receive an event batch which is then distributed evenly (e.g., on an event by event basis or according to another distribution technique whereby the system of the invention distributed the lag time across the playback or reproduction of events) across the reproduction or recreation of each event within that event batch. The invention may, for example, divide the number of events in the event batch by the lag time to get a lag time per event, or, may divide the number of time intervals between events in the event batch by the lag time to compute the lag time per event. Details of this processing will be explained later.

After the receiving processor 116-2 calculates the lag time and lag time per event in step 212, processing proceeds to step 213 at which point the receiving processor 116-2 performs the receiving event transponder 124-2 to re-create events identified in the event batch (e.g., the second event batch 151 in this example) based on the timestamps associated with each event in the event batch 151 while compensating for at least a portion of the lag time required to receive the event batch, as computed in step 212. In other words, as briefly explained above, the system of the invention re-creates events identified in event batch while removing or shaving-off an amount of time specified by the lag time per event between time intervals that occur before, during or after the recreation or playback of events in the event batch.

Using the techniques explained above, the system of the invention is able to more accurately reproduce events within event batches without disruption to network time delays and is also able to significantly reduce the amount of choppy or discontinuous motion during playback, or the amount of time by which the receiving computer system gets behind a sending computer system in the reproduction of events due to network lag. In other words, since the system of the invention helps to compensate for any lag time experienced during event batch transfers by removing this time as a lag time per event before, during or in-between the playback times of events in an event batch, the lag time experienced to receive event batches goes away or, stated differently, is compensated for, removed, or made up for during the reproduction of events on the receiving computer system 102. This process will be explained in more detail with respect to the remaining FIGS. 3 through 6, which illustrate more specific examples and principles of the invention.

Figure 3:
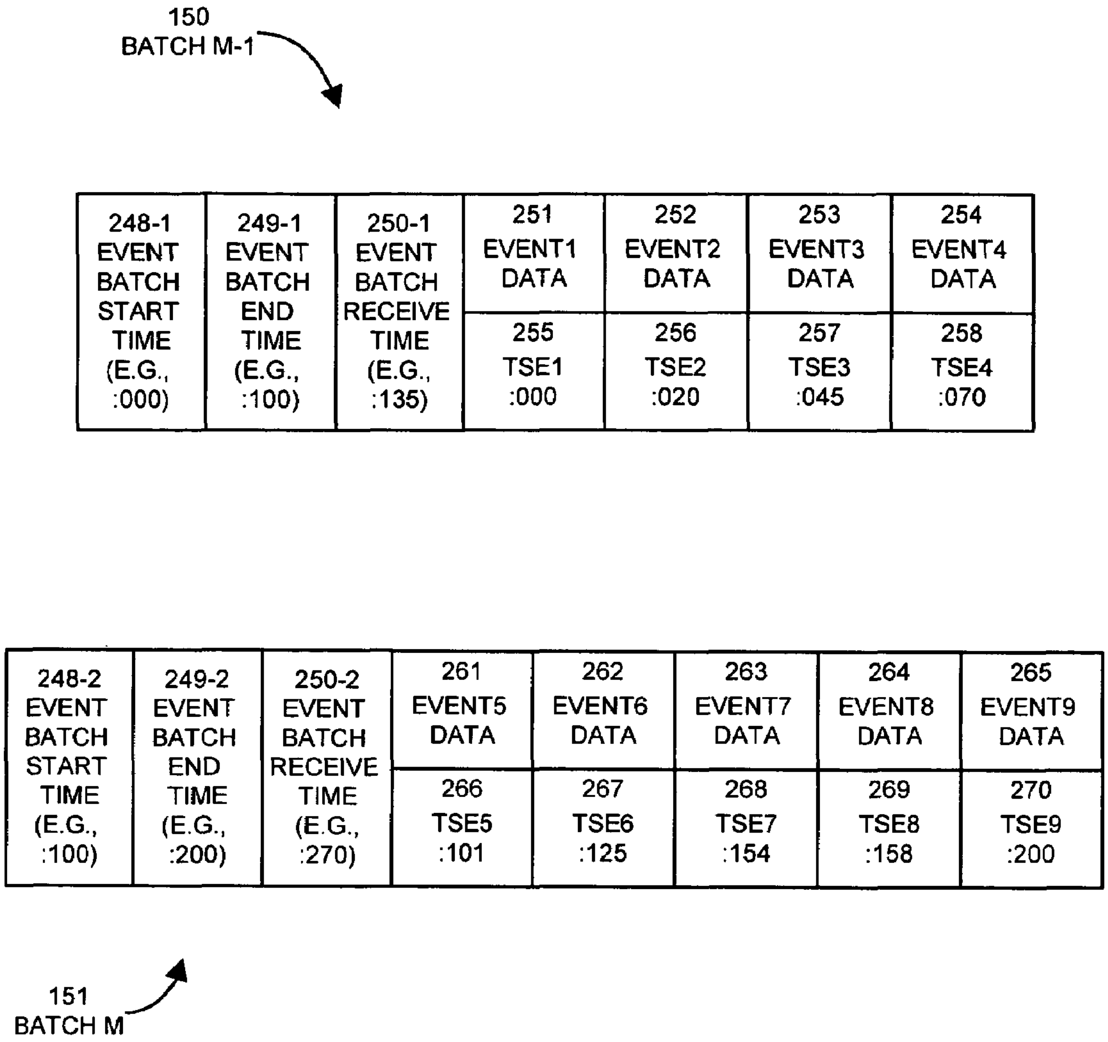
FIG. 3 illustrates an example of content contained within event batches configured according to embodiments of the invention.

FIG. 3 illustrates the contents of two example event batches 150 and 151. These example event batches 150 and 151 correspond to the event information that the sending event transponder 124-1 creates upon the detection of each event in a sending computer system 101, as explained above. In the illustrated examples, event batch 150 identifies (e.g., includes event information for) four events E1 through E4 while event batch 151 identifies five events E5 through E9. The event data fields 251 through 254 (and 261 through 265 for event batch 151) define event data related to the specific events (e.g., EVENT1 DATA through EVENT4 DATA for event batch 150). Event data may include event functionality defined for that event which is to be performed (e.g., via the receiving processor 116-2 on the receiving computer system 102) on a respective receiver object that corresponds to an identity of a receiver object defined within the event data. In other words, the event data for an event can identify a specific receiver object of the receiving computer system (e.g., a specific graphical object on the receiving display 114-2) that correlates to a sender object on the sending computer system 101 upon which that event functionality was initially performed. The event data can also identify a function or action which the receiving processor 116-2 is to perform on the receiver object. This action or event functionality specifies how the receiving event transponder 124-2 is to change, move, modify or otherwise manipulate the receiver object identified by the event data. As an example, event data might include a new position on the receiving display 114-2 for a receiver object.

Each event also includes a respective timestamp field 255 to 258 (266 to 270 for event batch 151). The timestamp fields contain the timestamp at which that event occurred on the sending computer system 101 (as stored in the event batch via step 201). Accordingly, the timestamps in the timestamp field indicate when each event was performed in relation to the other events in the event batch on the sending computer system 101 and also define the interval of time between events from which the lag time per event can be removed, as will be explained, in order to shorten the playback of the events in an event batch to compensate for network lag.

Each event batch also includes an event batch start time field, an event batch end time field and an event batch receive time field. Specific values for these fields for the event batches 150 and 151 are referred to in FIG. 3 with reference numerals 248-1 and 248-2, 249-2 and 249-2, and 250-1 and 250-2 respectively. In the following description, these fields for a generic event batch are referred to using the non-indexed reference numbers 248, 249 and 250 respectively. The event batch start time field 248 is a timestamp that the sending computer system 101 (i.e., the sending event transponder 124-1) creates for the event batch after a prior event batch is transmitted via step 204 as explained above. In other words, a new event batch begins upon transmission of a prior event batch in response to a batch transfer condition and the sending event transponder 124-1 records the time at which the new event batch begins in the event batch start time field 248. In many instances, the event batch start time 248 will be equal to the timestamp of the first event in that event batch. However, it may be the case that some period of time elapses following the transmission of one event batch before a new event is detected for the current event batch and thus the event batch start time field 248 may be a timestamp that is slightly prior to (i.e., behind) the timestamp of the first event in an event batch.

In a similar manner, the event batch end time field 249 for each event batch 150, 151 (and so forth) indicates a time on the sending computer system 101 at which the sending event transponder 124-1 transmits the event batch via processing step 204. The time difference between the event batch start time field 248 and the event batch end time field 249 for an event batch represents the total time that elapsed on the sending computer system 101 between the operations of transmitting a former event batch and transmitting the current event batch. In many instances, the event batch end time 249 will be equal to the timestamp of the last event in that event batch. However, it may be the case that some period of time elapses following the detecting of the last event in an event batch but before that event batch is transmitted, and thus the event batch end time field 248 may be a time slightly behind to the timestamp of the behind the last event in an event batch.

Figure 4:
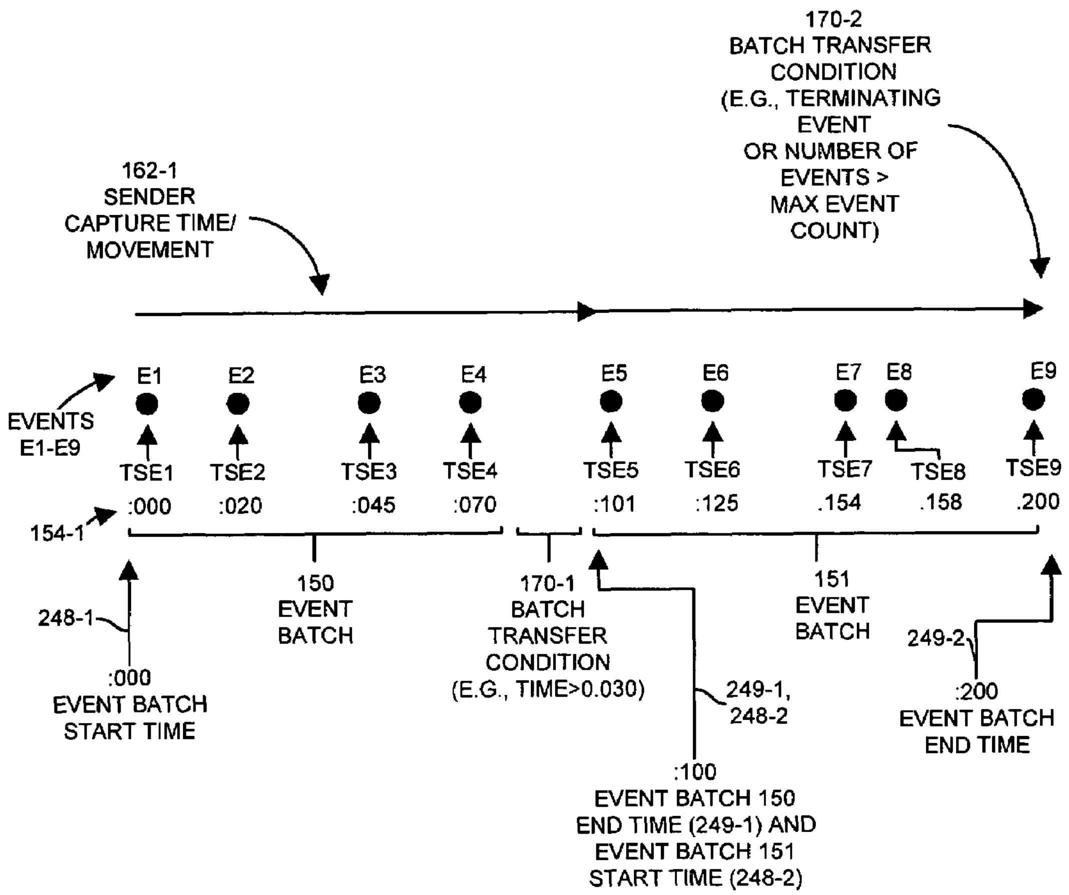
FIG. 4 illustrates an example of sending event batches for events which occur on a sending computer system configured in accordance with the invention.
Figure 5:
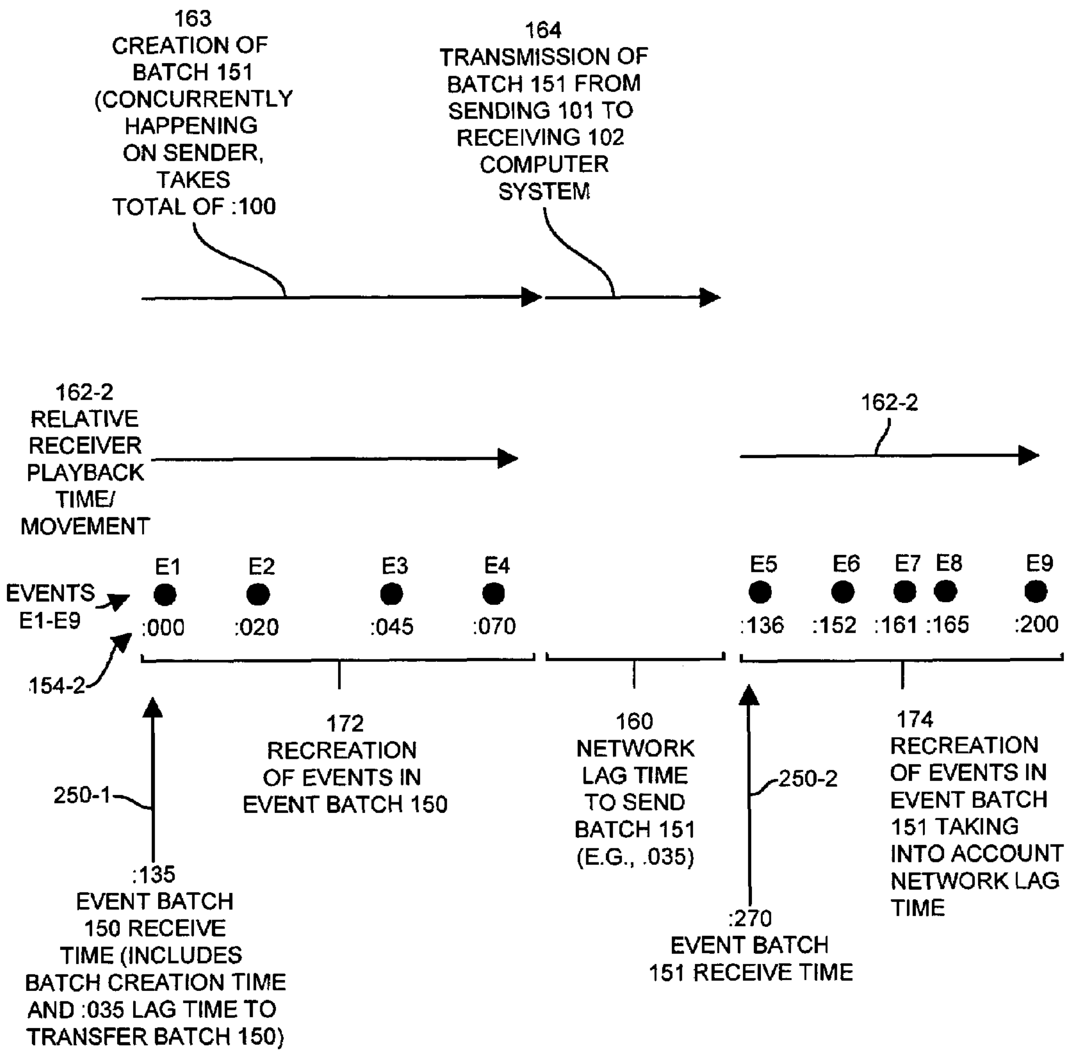
FIG. 5 illustrates an example of receiving event batches and re-creating events identified within those event batches on a receiving computer system configured in accordance embodiments of the invention.

FIGS. 4 and 5 illustrate a more detailed example of how the invention can capture events that transpire on a sending computer system 101 in event batches 150 and 151 and how the invention can then recreate these events on the receiving computer system 102.

Specifically, FIG. 4 illustrates a detailed example of sending event batches 150 and 151 from the sending computer system 101. As in the former examples, events are depicted as black circles and are labeled E1 through E9 respectively. Across the top of the events is a time line 162-1 that indicates sender capture time and movement on the sending computer system 101. A timestamp 154-1, respectively labeled TSE1 through TSE9 is shown for each event E1 through E9. These timestamps TSE1 through TSE9 reflect the progression of time during the detection of events beginning at time :000. The actual increments of time or time units in this example can be, for example, thousandths of a second, though it is to be understood that this is not meant to be limiting of the invention. Accordingly, the example timestamp values or time units may be multiples of any time increments. Also in this example, the detected events E1 through E9 do not occur in equal time intervals, but rather, occur in a more random pattern, though this is not necessarily always the case.

Below the timestamps 154-1 is information relating to the beginning and ending of event batches 150 through 151. In particular, at location 248-1, the event batch start time (:000) for event batch 150 is indicated. Also, the events E1 through E4 are shown to be included in event batch 150. It is to be understood that each event E1 through E9 shown in FIG. 4 is representative of a detected event which was processed by the processing steps formerly explained with respect to FIG. 2A. For example, the sending processor 116-1 on the sending computer system 101 detects each event E1 through E4 in event batch 150 (Step 200), generates the timestamp for the event (step 201), and then stores the event in event batch 150 (step 202).

Following the occurrence of event E4, a batch transfer condition 170-1 occurs. In this example, the batch transfer condition 170-1 is an elapsed time batch transfer condition in which more than 0.030 time units (e.g., thousands of a second in this example) have elapsed after the occurrence of event E4 and prior to detection of a new event E5. Accordingly, after the time of the batch transfer condition 170-1 elapses (i.e., after :030 time units elapse), the sending event transponder 124-1 processes step 204 in FIG. 2A to transmit the event batch 150. While not specifically shown in the former flow charts of processing steps, at this time, the sending event transponder 124-1 also inserts the event batch end time 249-1 into the event batch 150 just prior to its transmission. Also at this time, the sending event transponder 124-1 records the event batch start time 248-2 for the next event batch 151.

For event batch 151, the sending processor 116-1 again performs steps 200 through 203 for each event E5 through E9, as explained above. The batch transfer condition 170-2 triggering the completion or end of event batch 151 in this example may be a terminating event E9 or, the batch transfer condition may be that the number of events (five events in this example) in the event batch 151 has reached (or exceeded in this example) a maximum event count allowed for event batch. Accordingly, upon the occurrence of event E9, the sending processor 116-1 performs the sending event transponder 124-1 to record the event batch end time 249-2 (:200 in this example) for this event batch 151. In this manner, the processing of the invention as explained with respect to the previous examples and as shown in FIG. 2A allows the sending computer system 101 to capture events in event batches and transfer event information related to the events to the receiving computer system (or a collaboration adapter 130, FIG. 1) for recreation of the events based on event information in the event batches 150 and 151 on other computer systems.

FIG. 5 provides a detailed illustration of the recreation of events from the event batches 150 and 151 as produced in the example shown in FIG. 4. During recreation of the events E1 through E9 as shown in this example, the relative receiver playback time and movement of graphical objects represented by the events E1 through E9 is shown by time lines 162-2. That is, time and movement progress from left to right. Also as illustrated in this example, relative time of event playback is shown by the time entries 154-2. Essentially, the time entries 154-2 show times on the receiving computer system 102 at which each event is recreated. Note that for the first batch of events 150, each event E1 through E4 is re-created at the same relative time as it took place on the sending computer system 101.

It is important to note that the receiving computer system 102 (i.e., the receiving event transponder 124-2 performing on the receiving processor 116-2) does not receive the first event batch 150 until :135 time units (e.g., thousands of the second) have elapsed from the occurrence of the first event in the first event batch 150 on the sending computer system 101. This is because the receiving computer system 102 cannot receive the first event batch 150 until the sending computer system 101 captures and transmits all of the events E1 through E4 in the event batch 150. Recall from FIG. 4 that the event batch start time 248-1 and the event batch end time 249-1 for event batch 150 span a total elapsed time of :100 time units. The additional :035 time units reflected in event batch receive time 250-1 (having a value of :135) results from network lag incurred during the transfer of the event batch 150 from the sending computer system 101 through the network 105 to the receiving computer system 102. Thus if event playback clocks 154-1 and 154-2 are synchronized, the receiving computer system 102 does not begin the recreation of event E1 until :0135 time units have elapsed after it initial existence (i.e., detection) on the sending computer system 101.

As explained above, the processing of event batches 150 and 151 proceeds according to the operations shown in FIG. 2B. Accordingly, for the first event batch 150, each event E1 through E4 is re-created using the respective timestamps for those events without regard, in this embodiment, for compensation of network lag. Accordingly, the time entries 154-2 for events E1 through E4 are relatively the same as the timestamps for those events contained in event batch 150. That is, the receiving computer system 102 plays back the events E1 through E4 at the same relative time intervals as the actually occurred on the sending computer system 101.

It is important to understand at this point that while the receiving processor 116-2 is performing the processing in step 210 to receive the first event batch 150 and then to re-create or replay the events identified in the event batch 150, the sending processor 116-1 in the sending computer system 101 continues to perform the logic of the sending event transponder 124-1 to capture new events E5 through E9 in the second event batch 151. In other words, the event transponders 124-1 and 124-2 operates concurrently. This is shown in FIG. 5 by the time line 163 which shows the time required for the creation of event batch 151, which happens concurrently on the sending computer system 101 during the playback of event batch 150 on the receiving computer system 102, as just explained.

Also as illustrated in FIG. 5, once the sending computer system 101 has completed creation of the second event batch 151, the sending computer system 101 performs the transmission of the second event batch 151 to the receiving computer system 102 as shown by time line 164 in FIG. 5. This transmission time 164 is also illustrative of the network lag time 160 between the recreation of events in event batch 150 (at location 172 in FIG. 5) and the recreation of events in event batch 151 shown at location 174 in FIG. 5. In this example, the second event batch 151 experiences a network lag time of :035 time units.

Accordingly, the receiving computer system 102 receives the event batch 151 at an event batch receive time having a relative time unit value of :270. In other words, the receiving computer system received and played back the events in the first event batch 150 between relative time unit values :000 and :100. Concurrently during this process, the sending computer system 101 created and transmitted the second event batch 151. However, since this transmission of event batch 151 does not occur instantaneously, a network lag time of :035 time units is incurred.

However, as explained above with respect to the processing steps 211 through 213 in FIG. 2B and as illustrated graphically by the relative spacing between events E5 through E9 in FIG. 5 (as opposed to the same event spacing between events E1 through E9 in FIG. 4), the system of the invention, at location 174 in FIG. 5, is able to re-create the events in the event batch 151 while taking into account (i.e., removing) the network lag time 160 (e.g., by removing :035 time units from a total playback time required to re-create the events E1 through E9 in the event batch 151). Accordingly, the network lag time 160 does not accumulate from event batch to event batch in the receiving computer system 102.

While not specifically shown in the flow charts of processing steps of the invention, certain embodiments of the invention can provide an alternate feature that, in some circumstances, does not remove or account for lag time during playback of an event batch. This alternative configuration may be useful in circumstances where an event batch is completely received before the completion of the playback of a formerly received event batch. That is, assume for this alternative embodiment that the total time for all events E1 through E4 to occur in event batch 151 was only :050 time units. Then, even with a network lag time of :035 units, the receiving event transponder 124-2 would still receive event batch 151 before it had completed the playback of event batch 150 (the prior event batch), because it takes a total of :100 time units to recreate the events in event batch 150. As such, there is no need in such circumstances to compensate for network lag for events E5 through E9 in event batch 151 because the event batch 151 is received before it is actually needed for event re-creation.

Figure 6:
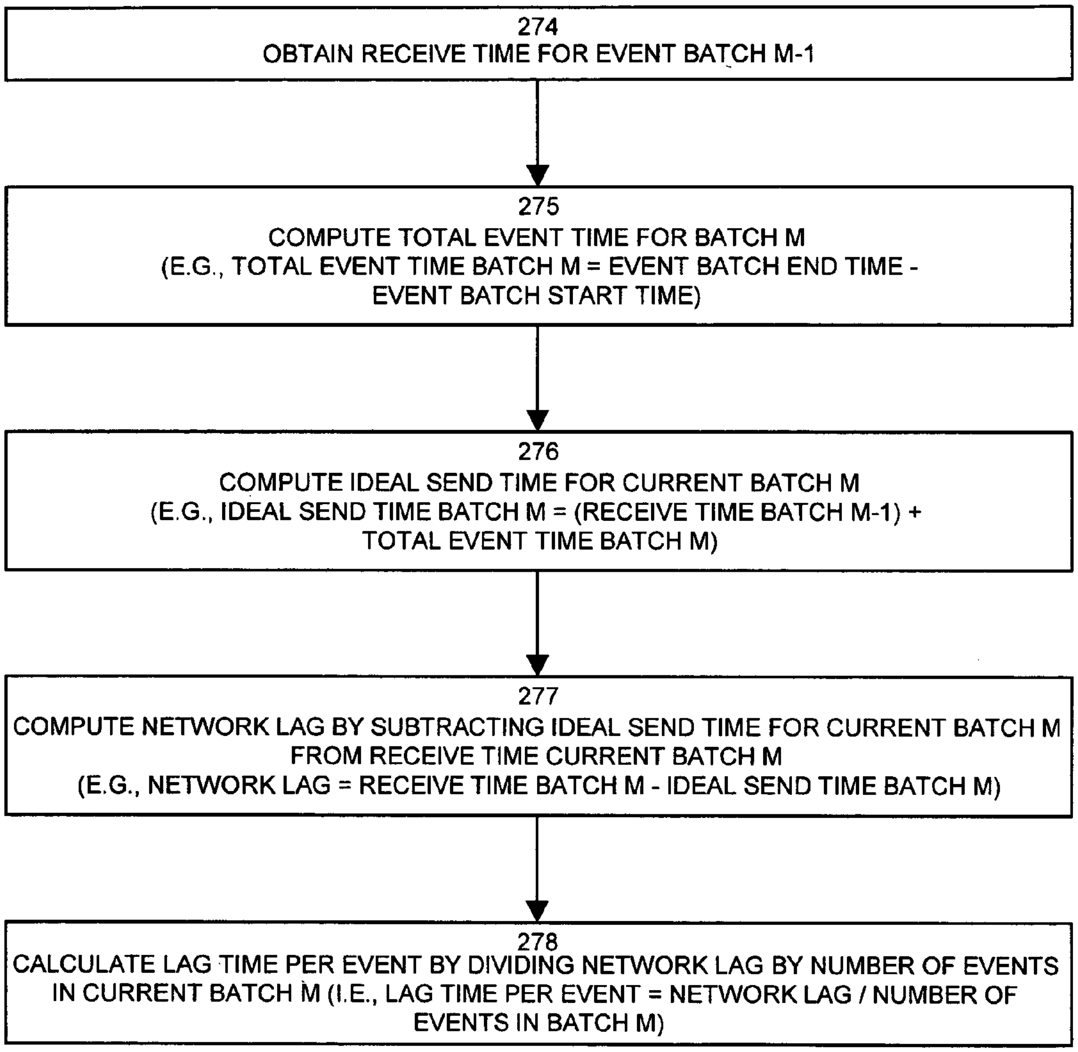
FIG. 6 is a flow chart of processing steps that illustrate how an event transponder that receives event batches can compute a lag time required to receive those event batches in accordance with one embodiment of the invention.

FIG. 6 illustrates a flow chart of processing steps provided and performed by embodiments of the invention to compute the lag time experienced during the transmission of an event batch from the sending computer system 101 to the receiving computer system 102. As explained above, this lag time is used during the playback of events in an event batch by removing at least a portion of the lag time from the playback time of at least one event in the event batch which experiences a lag time. Generally, the processing steps shown in FIG. 6 illustrates the details of processing operations performed in step 212 of FIG. 2B. It is to be understood that the processing steps shown in FIG. 6 are performed after receipt of each of the second, third, fourth, etc. event batches by the receiving computer system 102.

The processing steps 274 through 278 will be explained as being performed by the receiving processor 116-2 operating as the receiving event transponder 124-2. It is to be understood that the receiving processor 116-2 operates in this manner when the receiving processor 116-2 performs logic instructions within the receiving event transponder 124-2 that exist in the receiving memory system 120-2. For this description, the most recent event batch (i.e., the current event batch) will be referred to as event batch M. Also, this description will make reference to the event batches 150 (event batch M-1) in 151 (event batch M) as illustrated in detail in FIG. 3.

Generally, at a conceptual level, the operation in FIG. 6 determines how long the current event batch should take if all events are played back based on the start and end times of the event batch. Then, the system also determines the receive time for the former event batch. The sum of these two values provides a fictitious, ideal or optimal time at which the event batch should have been received. Then the system takes a difference between the actual receive time of the event batch and the optimal or ideal time at which the event batch could have been received were is not for network lag. The difference thus provides the network lag time.

More specifically, in step 274, the receiving processor 116-2 obtains the receive time for event batch M-1. In other words, in step 274, the receiving processor 116-2 obtains the receive time 250-1 for the event batch 150 received just prior to the current event batch 151.

In step 275, the receiving processor 116-2 computes a total event time for the current event batch M (e.g., the event batch 151). Generally, the total event time for an event batch M is the elapsed time between the event batch start time 248 and the event batch end time 249. In other words, for the event batch 151 the total event time is computed as follows:

Total event time for event batch *M*= (Event batch end time 249-2)−(Event batch start time 248-2)= (:200)−(:100)= :100

Next, in step 276, the receiving processor 116-2 computes an ideal send time for the current event batch M by adding the total event time for the event batch M to the receive time of event batch M-1 (i.e., the receive time of the prior event batch 150). The ideal send time for the current event batch M reflects the time in which the event batch should have been received in the absence of any network lag time 160. For event batch M 151, the ideal send time is computed as follows:

Ideal Send Time For The Current Event Batch *M*= (Receive Time Event Batch *M*-1 250-1)+(Total Event Time For Event Batch *M*)= (:135)+(:100)= :235

Next, in step 277, the processor 116-2 computes the network lag time for the current event batch M (e.g., for event batch 151) by subtracting the ideal send time for the current event batch M from the receive time of the current event batch M. That is:

Network Lag Time= (Receive Time Event Batch *M* 250-2)−(Ideal Send Time Event Batch M)= (:270) −(:235)= :035

In this manner, the system of the invention can compute the network lag time which is required to propagate the most recent event batch M (e.g., event batch 151) for the sending computer system 101 to the receiving computer system 102.

Finally, in step 278, the receiving processor 116-2 calculates a lag time per event by dividing the network lag time by a number of events in the current event batch M. That is:

Lag Time Per Event= Network Lag Time/Number of Events in Event Batch *M*= (:035)/5 (in this example for event batch 151)= :007

Once the system of the invention has computed the leg time per event, during the processing of step 213 at which point the receiving processor 116-2 re-creates the events in the current event batch M, the processor, for example, can elect to remove an amount of time equal to the lag time per event from each interval of time that elapses prior to the recreation of each event in the current event batch M (e.g., event batch 151).

Alternatively, the lag time per event can be computed based on the number of time intervals between events in an event batch. For example, if there are five events in event batch 151, there are four time intervals between these events. Thus, lag time per event may also be computed to be slightly differently using the following technique:

Lag Time Per Event= Network Lag Time/Number of Time Intervals Between Events= (:035)/4 (in this example for event batch 151)= :00875

This lag time per event represents an even distribution of lag time that can be removed from each respective time interval between events in an event batch M (e.g., 151).

In another alternative embodiment, a slightly different technique can be employed to compensate for network lag. In this embodiment, the system of the invention (i.e., the receiving event transponder 124-2) can remove as much of the network lag time as possible first from any time interval that may exist between the event batch start time and the timestamp of the first event in the event batch. Then, any remaining lag time can be removed evenly from the time intervals between events as explained above. For example, consider the example event batch 151 shown in FIG. 3. The event batch start time is:100, while the timestamp for the first event in this event batch 151 is :101. There is thus :001 time unit between the start of the event batch and the occurrence of the first event. This alternative embodiment would thus remove this :001 time interval from the playback sequence of events E5 through E9 for this event batch, thus eliminating :001 time unit from the network lag. There would thus be :034 time units of network lag that still need to be compensated for during the play back of events E5 through E9. One of the aforementioned techniques of distributing this remaining network lag (the remaining :034 time units) across the events can then be used by the invention to compensate for the entire network lag during event playback.

In another alternative configuration similar to the aforementioned configuration, network lag time could first be removed from time intervals that may exist before the first event (i.e., between the event batch receive time and the timestamp of the first event in the event batch, as just explained), and then any remaining network lag can be removed form a time interval in the event batch that might exist after the last event but before the end of the event batch. In both of the aforementioned alternative configurations, the general goal or objective is to remove network lag time at the beginning and/or end of the event batches, while leaving the time intervals between event recreations (i.e., between creations of events E5 through E9 for event batch 151) as unaffected as possible by network lag, thus providing a more realistic recreation of events. In this manner, if network lag is removed from event playback times before and after the beginning and end of the first and last events in an event batch, the events are recreated as close as possible to their actual initial occurrences on the sending computer system 101.

As shown by the different configurations and techniques to compensate for network lag, it is to be understood that the system of the invention can reduce the time intervals between a recreation of events in an event batch M in a number of different ways. For example, as explained above, the invention may simply reduce the time interval between each event in event batch by the network lag time per event. Alternatively, the system of the invention can be configured to perform step 213 in FIG. 2B by only reducing some intervals between some events in an event batch will not reducing other intervals between other events.

In this manner, lag time may be loaded and removed more or less from time intervals between either earlier, or later events in an event batch. For example, in an embodiment of the invention removes more of the :035 lag time units from later intervals in the event batch 151 (e.g., removes most of the :035 time units from time intervals between events E7 and E8, and E8 and E9), the playback of events E5 through E9 would appear to an observer to speed up. This is because the time intervals between the events become more and more compressed as more and more network lag time is compensated for in event intervals between later events in an event batch.

Another embodiment provides another variation on the compensation of network lag time during event playback. Consider a situation that can arise when to events occur between a short interval of time. If the time interval between the two event is relatively small (e.g., 1/10 of a second), further reducing the time interval by removing the lag time per event from this interval might produce a situation in which the two events have a reduced interval of time between them that is imperceptible by a person watching each event take place on the receiving display 114-2 of the receiving computer system 102. In other words, the two events might appear as one. To avoid this, the step 213 of re-creating an event identified in the event batch 151 in this embodiment can limit the subtraction of a portion of the lag time per event from an event playback time (i.e., from the time interval between two events during play back of those events) such that an amount of time between consecutive event playback times (e.g., time entries 154-2) is a perceptible amount of time (i.e., is not so small as to be imperceptible by a person) in which the events are re-created. In this manner, all of events in the event batch will be perceptible by a viewer of the receiving display 114-2.

Those skilled in the art will understand that there can be many variations made to the operations, techniques and mechanisms explained above while still achieving the same objectives of the invention. Such variations are intended to be covered by the scope of this invention. As an example of such a variation of the aforementioned example embodiments and descriptions, it is to be understood that the processing steps of the aforementioned flowcharts may be re-arranged will still accomplishing the objectives of the present invention. Those skilled in the art of computer programming should readily understand that there can be many ways to implement a software system that accomplishes the goals of the invention as claimed while performing the steps outlined above in slightly different orders, for example. As such, the foregoing description of embodiments of the invention are not intended to be limiting. Rather, any limitations to embodiments of the invention are presented in the following claims.

What is claimed is:

1. A method for processing event information, the method comprising the steps of:

receiving an event batch identifying a plurality of events;

calculating a lag time associated with the event batch;

dividing the number of events contained in the event batch by the lag time to determine a lag time per event; and recreating the events identified in the event batch at respective event playback times, each playback time being computed by subtracting at least a portion of the lag time per event from an event playback time computed based on a timestamp of the recreated event.

2. The method of claim 1 wherein the step of recreating the events identified in the event batch limits the subtraction of the at least a portion of the lag time per event from an event playback time such that an amount of time between consecutive event playback times is a perceptible amount of time at which events are recreated.

3. The method of claim 1 wherein the event batch is an event batch M and the step of receiving an event batch includes a step of:

generating a receive time for the event batch M; and wherein the step of calculating a lag time required to receive the event batch includes the steps of:

computing an ideal send time for the event batch M; and computing the lag time as a difference between the receive time for the event batch M and the ideal send time for the event batch M.

4. The method of claim 3 wherein the step of computing an ideal send time for the event batch M includes a step of adding a receive time for an event batch M-1 to an amount of elapsed time between a start and an end time of the event batch M.

5. The method of claim 3 wherein the step of recreating events identified in the event batch includes the steps of:

dividing the lag time by a multiple that is related to a number of events identified in the event batch to determine a lag time per event; and for each of the events identified in the event batch, performing event functionality defined for that event on a respective receiver object corresponding to an identity of a receiver object defined for that event in the event batch, at an event playback time that is computed based on:

i) a timestamp associated with the event; and ii) the lag time per event.

6. The method of claim 1 wherein the event batch is an event batch other than a first event batch and wherein the method further includes the steps of:

receiving the first event batch;

recreating events identified in the first event batch at respective event playback times computed based on a respective timestamps associated with each event identified in the first event batch; and performing the steps of receiving, calculating and recreating for all event batches other than the first event batch such that events identified in event batches received after the first event batch will be recreated by taking into account lag time required to receive the event batch in which those events are identified.

7. A computer system comprising:

an input output mechanism;

a processor;

a memory system; and an interconnection mechanism coupling the input output mechanism, the processor and the memory system;

wherein the memory system is encoded with an event transponder process that, when performed on the processor, causes the computer system to process event information by performing the operations of:

receiving an event batch identifying a plurality of events via the input output mechanism;

calculating a lag time associated with the event batch;

dividing the number of events contained in the event batch by the lag time to determine a lag time per event; and recreating the events identified in the event batch at respective event playback times, each event playback time being computed by subtracting at least a portion of the lag time per event from an event playback time computed based on a timestamp of the recreated event.

8. The computer system of claim 7 wherein when the processor performs the operation of recreating at least one event identified in the event batch, the processor performs the operation of limiting the subtraction of the at least a portion of the lag time per event from an event playback time such that an amount of time between consecutive event playback times is a perceptible amount of time at which events are recreated.

9. The computer system of claim 7 wherein the event batch is an event batch M and wherein when the processor performs the operation of receiving an event batch, the processor performs the operation of:

generating a receive time for the event batch M; and wherein when the processor performs the operation of calculating a lag time required to receive the event batch, the processor performs the operations of:

computing an ideal send time for the event batch M; and computing the lag time as a difference between the receive time for the event batch N and the ideal send time for the event batch M.

10. The computer system of claim 9 wherein when the processor performs the operation of computing an ideal send time for the event batch M, the processor performs the operation of adding a receive time for an event batch M-1 to an amount of elapsed time between a start and an end time of the event batch M.

11. The computer system of claim 7 wherein when the processor performs the operation of recreating events identified in the event batch, the processor performs the operations of:

dividing the lag time by a multiple that is related to a number of events identified in the event batch to determine a lag time per event; and for each of the events identified in the event batch, performing event functionality defined for that event on a respective receiver object corresponding to an identity of an receiver object defined for that event in the event batch, at an event playback time that is computed based on:

i) a timestamp associated with the event; and ii) the lag time per event.

12. The computer system of claim 7 wherein the event batch is an event batch other than a first event batch and wherein the processor further performs the operations of:

receiving the first event batch via the input output mechanism;

recreating events identified in the first event batch at respective event playback times computed based on a respective timestamps associated with each event identified in the first event batch; and performing the operations of receiving, calculating and recreating for all event batches other than the first event batch such that events identified in event batches received after the first event batch will be recreated by taking into account lag time required to receive the event batch in which those events are identified.

13. A computer program product having a computer-readable medium including computer program logic encoded thereon for processing event information, such that the computer program logic, when performed on at least one processor within a computer system, causes the at least one processor to perform the operations of:

receiving an event batch identifying a plurality of events;

calculating a lag time associated with the event batch;

dividing the number of events contained in the event batch by the lag time to determine a lag time per event; and recreating the events identified in the event batch at respective event playback times, each playback time being computed by subtracting at least a portion of the lag time per event from an event playback time computed based on a timestamp of the recreated event.

14. The computer program product of claim 13 wherein recreating the events identified in the event batch limits the subtraction of the at least a portion of the lag time per event from an event playback time such that an amount of time between consecutive event playback times is a perceptible amount of time at which events are recreated.

15. The computer program product of claim 13 wherein:

the event batch is an event batch M, and receiving an event batch includes generating a receive time for the event batch M; and calculating a lag time required to receive the event batch includes:

computing an ideal send time for the event batch M; and computing the lag time as a difference between the receive time for the event batch M and the ideal send time for the event batch M.

16. The computer program product of claim 15 wherein computing an ideal send time for the event batch M includes adding a receive time for an event batch M-1 to an amount of elapsed time between a start and an end time of the event batch M.

17. The computer program product of claim 15 wherein recreating events identified in the event batch includes:

dividing the lag time by a multiple that is related to a number of events identified in the event batch to determine a lag time per event; and for each of the events identified in the event batch, performing event functionality defined for that event on a respective receiver object corresponding to an identity of a receiver object defined for that event in the event batch, at an event playback time that is computed based on:

i) a timestamp associated with the event; and ii) the lag time per event.

18. The computer program product of claim 13 wherein the event batch is an event batch other than a first event batch and wherein operations performed by the at least one processor further include:

receiving the first event batch;

recreating events identified in the first event batch at respective event playback times computed based on a respective timestamps associated with each event identified in the first event batch; and performing the steps of receiving, calculating and recreating for all event batches other than the first event batch such that events identified in event batches received after the first event batch will be recreated by taking into account lag time required to receive the event batch in which those events are identified.

19. A computer system comprising:

means for receiving an event batch identifying a plurality of events;

means for calculating a lag time associated with the event batch;

means for dividing the number of events contained in the event batch by the lag time to determine a lag time per event; and means for recreating the events identified in the event batch at respective event playback times, each playback time being computed by subtracting at least a portion of the lag time per event from an event playback time computed based on a timestamp of the recreated event.

20. The computer system of claim 19 wherein the event-recreating means includes means for limiting the subtraction of the at least a portion of the lag time per event from an event playback time such that an amount of time between consecutive event playback times is a perceptible amount of time at which events are recreated.

21. The computer system of claim 19 wherein:

the event batch is an event batch M and the event-batch-receiving means includes means for generating a receive time for the event batch M; and the lag-time-calculating means includes:

means for computing an ideal send time for the event batch M; and means for computing the lag time as a difference between the receive time for the event batch M and the ideal send time for the event batch M.

22. The computer system of claim 21 wherein the send-time-computing means includes means for adding a receive time for an event batch M-1 to an amount of elapsed time between a start and an end time of the event batch M.

23. The computer program product of claim 21 wherein the event-recreating means includes:

means for dividing the lag time by a multiple that is related to a number of events identified in the event batch to determine a lag time per event; and means operative, for each of the events identified in the event batch, to perform event functionality defined for that event on a respective receiver object corresponding to an identity of a receiver object defined for that event in the event batch, at an event playback time that is computed based on:

i) a timestamp associated with the event; and ii) the lag time per event.

24. The computer program product of claim 19 wherein the event batch is an event batch other than a first event batch, and further comprising:

means for receiving the first event batch;

means for recreating events identified in the first event batch at respective event playback times computed based on a respective timestamps associated with each event identified in the first event batch; and means for performing the steps of receiving, calculating and recreating for all event batches other than the first event batch such that events identified in event batches received after the first event batch will be recreated by taking into account lag time required to receive the event batch in which those events are identified.

25. A method for processing event information, the method comprising the steps of:

receiving an event batch M identifying a plurality of events;

generating a receive time for the event batch M;

calculating a lag time associated with the event batch M by (1) computing an ideal send time for the event batch M by adding a receive time for an event batch M-1 to an amount of elapsed time between a start time and an end time of the event batch M, and (2) computing the lag time as a difference between the receive time for the event batch M and the ideal send time for the event batch M; and recreating events identified in the event batch M while compensating for at least a portion of the lag time required to receive the event batch M, including:

dividing the number of events contained in the event batch M by the lag time to determine a lag time per event; and recreating the events identified in the event batch M at respective event playback times, each event playback time being computed by subtracting at least a portion of the lag time per event from an event playback time computed based on a timestamp of at least one event contained in the event batch.

26. A computer system comprising:

an input output mechanism;

a processor;

a memory system; and an interconnection mechanism coupling the input output mechanism, the processor and the memory system;

wherein the memory system is encoded with an event transponder process that, when performed on the processor, causes the computer system to process event information by performing the operations of:

receiving an event batch M identifying a plurality of events;

generating a receive time for the event batch M;

calculating a lag time associated with the event batch M by (1) computing an ideal send time for the event batch M by adding a receive time for an event batch M-1 to an amount of elapsed time between a start time and an end time of the event batch M, and (2) computing the lag time as a difference between the receive time for the event batch M and the ideal send time for the event batch M; and recreating events identified in the event batch M while compensating for at least a portion of the lag time required to receive the event batch M, including:

dividing the number of events contained in the event batch M by the lag time to determine a lag time per event; and recreating the events identified in the event batch M at respective event playback times, each event playback time being computed by subtracting at least a portion of the lag time per event from an event playback time computed based on a timestamp of at least one event contained in the event batch.

* * * * *